(No Model.)
O. F. PAEPKE.
CASTER.
No. 265,939. Patented Oct. 10, 1882.
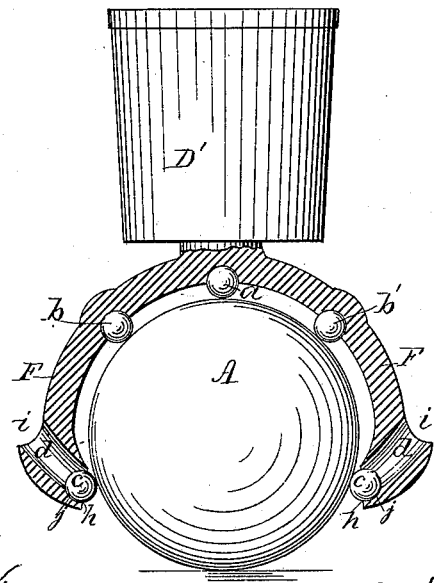
WITNESSES
INVENTOR
Oscar F. Paepke

UNITED STATES PATENT OFFICE.

OSCAR F. PAEPKE, OF INDIANAPOLIS, INDIANA.

CASTER.

SPECIFICATION forming part of Letters Patent No. 265,939, dated October 10, 1882.

Application filed February 17, 1882. (No model.)

*To all whom it may concern:*

Be it known that I, OSCAR F. PAEPKE, of Indianapolis, in the county of Marion and State of Indiana, have invented certain new and useful Improvements in Furniture and Safe Casters; and I do hereby declare that the following is a full, clear, and exact description thereof, which will enable others skilled in the art to which it appertains to make and use the same, reference being had to the accompanying drawing, which forms a part of this specification.

It consists in details of construction and arrangement of parts that will be hereinafter more fully set forth in the specification and claims, and pointed out in the accompanying drawing, in which the figure is a section of my device.

Referring more particularly to the drawings, A represents the supporting-ball of the caster. Across this ball are placed two arms, F, crossing each other transversely, so as to provide four holding or clutching claws or points at their lower ends. The ends of the arms do not reach entirely around the ball A, but just sufficiently below the horizontal plane passing through its center to enable the ends to hold and lift the ball. At the point of intersection of these arms a depression is formed for the reception of a small ball, $a$. This depression is made sufficiently large to receive very loosely not quite all of the upper half of said ball $a$, and at forty-five degrees from the top of ball A a similar ball, $b\ b'$, is placed in like depressions in each of the holding-arms. At the lower points a groove, $d$, is made, in which a ball, $c$, is dropped, and fits in seats $h$ in said grooves. This form of construction enables the balls $c$ to impinge against the large ball A and hold it, besides preventing friction against the ends of the arms. In order to place the ball A in position, the arms are turned upside down, the balls $a\ b\ b'$ placed in their depressions, the ball A then placed between the arms, and the balls $c$ dropped into the recesses or grooves $d$, the arms being held in their normal position. The leg may rest in a socket, D'; or the caster may be provided with the usual post and flanged collar for attaching it to the furniture-leg. The ends of the arms being enlarged and stiff, with their inner parts so far apart that after the balls $a$ and $b\ b'$ are placed in their recesses the ball A is drop on them, then the balls $c$ dropped through the openings $d$ until they strike A and rest on the shoulders L, the space between the balls $c\ c$ being less than the diameter of ball A. Said ball is held up against balls $a$ and $b\ b'$. It will thus be seen that the weight of the caster is directly over the ball, and the caster can be turned and moved easily in any direction. The arms F may represent the claws of a bird, and be made in three parts crossing each other, as described; or they may be made in any suitable or ornamental way. I prefer to make them in one piece, of cast-iron or brass; but they may be made of hard rubber, papier-maché, wood, or other suitable material.

It is obvious that the socket D' can be made in one piece with the arms.

The large and small balls may be of glass, iron, or other suitable material.

Having thus described my invention, what I claim as new, and desire to secure by Letters Patent, is—

A caster having three or more arms provided with interior depressions for the reception of friction-balls placed above the horizontal plane of the caster-ball, and grooves in the lower ends of the arms to receive friction-balls, whereby the caster-ball A is held up against the upper friction-balls, as set forth.

In testimony that I claim the foregoing as my own I have hereto affixed my signature in presence of two witnesses.

OSCAR F. PAEPKE.

Witnesses:
 W. H. PONTIOUS,
 F. M. LACEY.